Patented Oct. 7, 1952

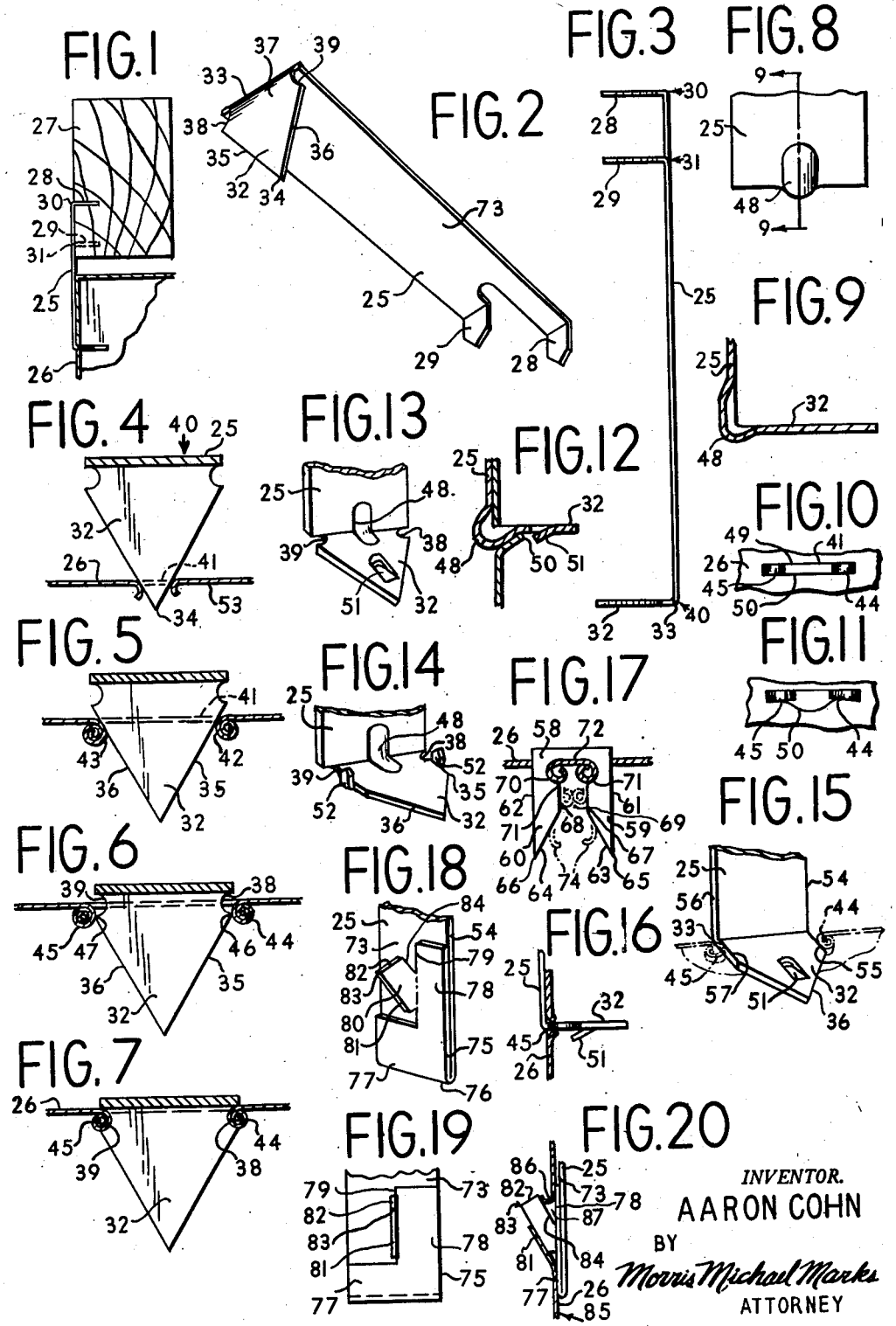

2,612,813

UNITED STATES PATENT OFFICE 2,612,813

ATTACHING MEANS

Aaron Cohn, Philadelphia, Pa.

Application September 20, 1948, Serial No. 50,224

1 Claim. (Cl. 85—11)

My invention relates to attaching means, and it relates more particularly to means for attaching devices to a supporting member. Thus, for instance, my invention is applicable for securing an air-conditioner duct to a beam or wall; or it may be used for suspending a sheet metal panel or screen; or it may be used for attaching a sign to a supporting member. Indeed, my invention is applicable in general for attaching many different kinds of devices to any of various desired supports, and it is not to be limited to the specific uses illustrated or described herein. For purposes of illustration only, my invention will be described as used for attaching a sheet metal air-conditioner conduit to an overhead beam, although it is equally adaptable for use in attaching other devices to other supporting members, without departing from the spirit or essential attributes of my invention.

In securing sheet metal conduits to supporting members, various problems have arisen. Thus, for instance, it has been the practice to wrap a strap about the conduit, and to attach the ends of the strap to an overhead beam. This has proven cumbersome and unreliable. Moreover, undue strains on the strap tend to warp the corner edges of the conduit and thereby to act destructively thereon. In order to avoid some of this difficulty, an attempt has been made to suspend the conduit by means of saddle-type hangers. This too, has proven unsatisfactory in that it is still cumbersome to apply, requires both ends of the saddle to be secured to the supporting means, and still does not inhibit warpage or restrict any tendency to move the conduit longitudinally or upwardly. A further attempt has been made to overcome these objections, by providing a hanger with prongs at one end and a hook at the other, the prongs being used first, to form an opening in the sheet metal conduit, and then to be driven into the supporting member, while the hook is slipped into the opening so that the conduit can be suspended therefrom. This too, has proven unsatisfactory in that careful measurements must be made properly to locate the opening in the conduit, and the hook-opening arrangement tends to widen the opening and thereby to allow leakage therethrough. Moreover, vibration may tend to dislodge the hook from the conduit.

An object of my invention therefore is to provide an attaching means which will be positive in operation, reliable in use and quick and easy to apply.

Another object of my invention is to provide an attaching means which can be secured to sheet material by simple pressure or by the blow of a hammer.

A further object of my invention is to provide an attaching means which will in use react with the device to be attached, in such a way as automatically to lock the two together and thereby to prevent undesired displacement of one with respect to the other.

Another object of my invention is to provide an attaching means which is easy and inexpensive to manufacture, inexpensive to apply, and may be depended upon to hold the attached device rigid.

Other objects will be apparent from the description and claim which follow.

For the purpose of illustrating my invention, I have shown in the accompanying drawings forms thereof which are at present preferred by me, since the same have been found in practice to give satisfactory and reliable results, although it is to be understood that the various instrumentalities of which my invention consists can be variously arranged and organized and that my invention is not limited to the precise arrangements and organizations of the instrumentalities as herein shown and described.

Referring to the drawings in which like reference characters indicate like parts:

Figure 1 represents a vertical sectional view of an attaching means securing a sheet metal duct to a beam, and embodying my invention.

Figure 2 represents a perspective view of an attaching means embodying my invention.

Figure 3 represents a side elevational view of an attaching means embodying my invention.

Figure 4 represents a plan sectional view of an attaching means in one stage of its insertion into the device to be attached, embodying my invention.

Figure 5 represents a plan sectional view of an attaching means in a later stage of its insertion in a device to be attached, and embodying my invention.

Figure 6 represents a plan sectional view of an attaching means in a still further stage of its insertion in a device to be attached, and embodying my invention.

Figure 7 represents a sectional view of an attaching means in its final stage of insertion in a device to be attached, and embodying my invention.

Figure 8 represents a fragmentary elevational view of an attaching means of modified construction, embodying my invention.

Figure 9 represents a view taken in section along the lines 9—9 of Figure 8.

Figure 10 represents an elevational view of the orifice formed in a device to be attached, during the first stage of insertion therein, of the attaching means of modified construction illustrated in Figures 8 and 9.

Figure 11 represents the orifice formed in a device to be attached, during the latter stages of the insertion therein, of the attaching means of modified construction illustrated in Figures 8 and 9.

Figure 12 represents a fragmentary vertical sectional view of an attaching means of another modified construction, inserted in a device to be attached, and embodying my invention.

Figure 13 represents a fragmentary perspective view of the attaching means illustrated in Figure 12.

Figure 14 represents a fragmentary perspective view of an attaching means of a further modified construction embodying my invention.

Figure 15 represents a fragmentary perspective view of an attaching means of still another modified construction, embodying my invention.

Figure 16 represents a vertical elevational view of the attaching means of modified construction illustrated in Figure 15, fully inserted in a device to be attached, and embodying my invention.

Figure 17 represents a bottom plan view of an attaching means of a still further modified construction, fully inserted within a device to be attached, and embodying my invention.

Figure 18 represents a fragmentary perspective view of an attaching means of still another modified construction embodying my invention.

Figure 19 represents a fragmentary elevational view of the attaching means illustrated in Figure 18.

Figure 20 represents a fragmentary side elevational view of the attaching means illustrated in Figures 18 and 19, fully inserted within a device to be attached, and embodying my invention.

I preferably form my attaching means of heavy gauge sheet metal, although it is not limited to heavy gauge, and it can be formed of malleable metal, cast metal, plastic or any other desired material of sufficient strength to hold the desired device to the desired supporting means. Thus, for illustrative purposes only, I am herein describing my invention as made of heavy gauge sheet metal.

According to my invention, I provide a connecting shank 25 for securing the device 26 to the supporting member 27. For purposes of illustration only, the device 26 is illustrated as a sheet metal duct, although it is to be understood that my invention is applicable for attaching other devices, and devices formed of other material than sheet metal. Moreover, for purposes of illustration only, my invention is illustrated as attaching the device 26 to a wooden beam 27. However, it is to be understood that this too, is for purposes of illustration only, and that my invention is equally adapted for insertion into any material which will support a nail, and with but slight modification (not shown) of shape, can even be used for hooking or hanging the shank 25 onto any desired supporting device.

In a preferred form of my invention, prongs or projections 28 and 29 are struck perpendicularly out of one face of the shank 25, preferably in spaced relation to each other. The prongs 28 and 29 are adapted to be inserted into, and interlock with, a suitable supporting member 27, preferably by being driven into it by hammer blows directed at the shank 25 immediately behind the prongs 28, at the respective locations 30 and 31.

A prong 32 is struck out of the end 33 of the shank 25 opposed to the end region thereof out of which the prongs 28 and 29 are struck. In a preferred form of my invention, the prong 32 projects from, and is perpendicular to, the shank 25 and faces the same direction as the prongs 28 and 29.

In the embodiment of my invention illustrated in Figures 2 to 7, inclusive, the prong 32 comprises the leading edge 34 formed by the juncture of the inclined side edges 35 and 36 which are formed in the shape of a V and project from the base region 37 outwardly to the point 34. The side edges 35 and 36 terminate rearwardly in respective grooves or receptacles 38 and 39 which are formed in the base region 37, and preferably between the side edges 35, 36, and the shank 25. The grooves 38 and 39 comprise a retaining portion having a forward bearing edge or latching portion.

In operation, when it is desired to insert the prong 32 into a sheet metal panel 26, the leading edge 34 is placed on the proper or desired location of the panel 26, and a hammer blow or other pressure is directed at the shank 25 immediately behind the prong 32 and in the direction indicated at 40. The leading edge 34 thereupon pierces and penetrates the wall 26, forming a slot 41 therein whose side edges are ever widened by the advancing prong 32. In this widening process, the side edges 42 and 43 of the slot 41 are increasingly displaced against the normal resistance imposed by the elasticity or resilience of the material of which the device 26 is formed. In the case of sheet metal, the walls 42 and 43 will curl away from the respective advancing edges or cams 35 and 36, forming spiral convolutes 44 and 45. As the prong 32 continues its advance into the device 26, the spiral convolutes 44 and 45 uncover the respective rear edges 46 and 47 of the side edges 35 and 36, and spring back into the grooves 38 and 39, by reason of the inherent elasticity or resilience of the material of which the convolutes 44 and 45 are made, thereby locking the prong 32 against outward displacement with respect to the wall 26. In the case of devices 26 which are made of solid pierceable material of substantial thickness, such for instance, as a block of wood (not shown), instead of spiral convolutes being formed, the material of which the device 26 is made will be compressed against its own resiliency until the prong 32 will have been fully inserted, whereupon the material close to the outer edge of the slot 41, will by its own resiliency spring back into the grooves 38 and 39, thereby locking the prong 32 against outward displacement.

In Figures 8 to 11 inclusive, are illustrated a modified construction embodying my invention. Herein, substantially the same shank 25 and prong 32 are used. However, a knob or protuberance 48 is struck rearwardly and downwardly out of the median juncture region 33 between the shank 25 and the prong 32.

In operation, as the prong 32 advances into the device 26 to be attached, as has hitherto been explained, the slot 41 is formed in the device 26, having respective parallel upper and lower edges 49 and 50, and spiral convolute sides 44 and 45. These side convolutes 44, 45, spring into the grooves 38 and 39, operatively to interlock therewith and to latch the prong 32 against outward displacement with respect to the device 26.

In this modified construction of my invention, however, as the prong 32 advances into the device 26, the protuberance 48 is presented to the device 26, and cams the lower edge 50 of the slot 41 downwardly, as may be seen more clearly in Figure 11, thereby drawing together the lower portions of the spiral convolutes 44 and 45, further to urge them into interlocking condition with the grooves 38 and 39.

In Figures 12 an 13 are illustrated another modified construction embodying my invention. In this construction, the shank 25, prong 32 and preferably the protuberance 48 are provided, substantially as in the construction illustrated in Figures 9 to 11 inclusive. In addition, however, an auxiliary prong 51 is rearwardly struck out of the prong 32, aplanar to the prong 32, preferably but not necessarily in a downward direction, and likewise preferably but not necessarily along the longitudinal axis of the prong 32. The prong 51 thus projects downwardly and rearwardly in a manner to abut against or interlock with the lower edge 50 of the slot 41.

In Figure 14 is illustrated a further modified construction embodying my invention, wherein the shank 25, prong 32 and preferably the protuberance 48, are substantially the same as those illustrated in the modified construction shown in Figures 9 to 11 inclusive; but auxiliary prongs 52 are disposed at the rearward ends of the prong 32 intermediate the side edges 35, 36 thereof and the grooves 38, 39, and preferably aplanar to the prong 32. In this construction, as the prong 32 advances into the device 26 the auxiliary prongs 52 are urged into said device and serve further to interlock with the spiral convolutes 44 and 45; and particularly so, should said convolutes for any reason be warped out of horizontal alignment. Moreover, should there ever for any reason be any outward displacement of the prong 32 to the extent of bringing the prongs 52 in juxtaposition to said wall 53, the downward protuberance 48 tending to urge the prong 32 upwardly, any upward displacement would cause the prongs 52 to interlock with the inner face 53 of the wall 26. Thus, a secondary latch is automatically provided.

In Figures 15 and 16 are illustrated another modified construction embodying my invention. In this construction, I provide a shank 25 and prong 32 of substantially the same construction as that illustrated in Figures 2 and 3, except that the grooves 38 and 39 are deleted therefrom. Thus, the side edge 54 of the shank and the side edge 55 of the prong intermediate the juncture 33 and the rearward end of the inclined edge 36, are preferably continuous and coplanar, and the opposed side edge 56 of the shank 25, and the opposed side edge 57 of the prong 32, are likewise preferably continuous and coplanar. An auxiliary prong 51 is preferably struck out of the face of the prong 32.

In operation, the prong 32 is urged inwardly into the device 26 to be attached, and in so doing forms a slot 41 therein, intermediate the spiral convolutes 44 and 45 which are brought to bear against the respective side edges 55 and 57 of the prong 32 by means of the inherent resilience of the spiral convolutes 44 and 45. In the process of inserting the prong 32 into the device 26, the auxiliary prong 51 passes over the wall 50 of the slot 41 and latches against the rearward face 53 of the wall 26. Thus, the attaching means is prevented from being displaced outwardly, by reason of the latching of the auxiliary prong 51 against the wall 26, and any sideward displacement or movement of the attaching means with respect to the wall 26, is inhibited by the pressure of the spiral convolutes 44 and 45 against the sides 55 and 57 of the prong 52. Thus, the prong 32 is tightly gripped in place and is interlocked with the wall 26 in such a manner as to prevent outward displacement therefrom.

In Figure 17 is illustrated a further modified construction embodying my invention. In this construction, a double prong 58 is provided in place of the prong 32. This double prong 58 comprises a plurality of prongs, 59 and 60, preferably having parallel outer edges 61 and 62, and forwardly inclined edges 63 and 64 intercepting the outer edges 61 and 62 at their respective forward ends 65 and 66. The inclined edges 63, 64 rearwardly approach each other along the plane of the double prong 58, and terminate in respective, preferably parallel, eges 67 and 68 defining a channel 69 therebetween. The rearward ends of the preferably parallel edges 67, 68, terminate in a retaining groove 70 of greater width than the channel 69, and comprising forward walls 71, and a rearward wall 72 which is preferably coplanar with the forward edge 73 of the shank 25.

In operation, the double prong 58 is urged toward the device 26 until the points 65, 66 penetrate the wall 26, whereupon the sheet material of which the wall is formed curls away from the inclined edges 63 and 64, in spiral convolutes as indicated at 75. Further advancing of the double prong 58 into the device 26, causes the convolutes 74 to roll toward each other and yieldingly to pass through the channel 69 until they have uncovered the rearward edge thereof, whereupon they spring away from each other and into the retaining groove 70. In so doing, they latch against the forward edges 71 of the retaining groove 70, operatively to prevent outward displacement of the double prong 58. In cases where the material of which the device 26 is made, is of considerable thickness, instead of spiral convolutes being formed as the double prong 58 advances into the device 26, the material of which said device 26 is made, will be compressed between the advancing edges 63, 64, and between the parallel edges 67, 68, until the insertion of the double prong 58 is completed, whereupon said compressed material will tend to decompress by virtue of its inherent resilience or elasticity, and thereby to expand within the retaining groove 70, operatively to latch against the forward edges 71 thereof and thereby to prevent outward displacement of the double prong 58.

In Figures 18, 19 and 20 are illustrated another modified construction embodying my invention. In this construction, I provide a shank 25 with a reverse bend 75 at its lower end 76. The reverse bend 75 comprises a base portion 77 preferably extending the full width of the shank 25, and an upper portion 78 preferably extending from one edge 54 of the shank 25 to substantially the median 79 of said shank 25. The base portion 77 and the upper portion 78 are preferably flush with the forward face 73 of the shank 25.

A prong 80 projects forwardly from the edge 79 of the upper portion 78, and preferably is formed by being struck out of the blank of which the reverse bend 75 is made, and folded substantially along the edge 79, to a plane perpendicular to the plane of the upper portion 78. The prong 80 comprises forwardly inclined leading edges 81 and 82 terminating in the leading edge or point 83. A rearward edge 84, preferably inclined, extends from the upper leading edge 82 downwardly to the portion 78.

In operation, the leading edge 83 is urged forwardly into the device 26 until the base portion 77 and the upper portion 78 are flush with the outer face 85 of the device 26. In so doing, the material of which the device 26 is formed is split into an upper and a lower portion; and the lower portion is cammed downwardly beneath the leading edge 81, and resiliently bears thereagainst; while the upper portion is cammed upwardly by the leading edge 82 to form the beginning of a spiral convolute 86 which, when it uncovers the rearward edge 84, resiliently springs downwardly into the notch 87 formed between the rearward edge 84 and the forward face 73 of the shank 25, thereby latching against the rearward edge 84 and inhibiting outward displacement of the attaching means with respect to the device 26.

It will thus be seen, that by my novel invention, I have provided means whereby a device can be attached to a support by the simple expedient of driving or pressing my novel attaching means into both the device and the support. Moreover, by so doing, the attaching means of my invention is automatically interlocked with the device to be attached, and cannot be unintentionally removed or displaced therefrom.

I am aware that the invention may be embodied in other specific forms without departing from the spirit or essential attributes thereof, and I therefore desire the present embodiments to be considered in all respects as illustrative and not restrictive, reference being had to the appended claim rather than to the foregoing description to indicate the scope of the invention.

Having thus described my invention, what I claim as new, and desire to secure by Letters Patent, is:

An attaching means for use with a device of resilient material; said attaching means comprising a sheet material shank and a substantially V-shaped sheet material prong projecting from said shank and substantially perpendicular thereto; said prong comprising a face portion and an edge having a recess portion and a cam leading to said recess portion; said cam being adapted to guide said resilient material into said recess portion; said recess portion comprising a latching portion adapted to interlock with said resilient material in said recess portion, said recess portion extending from said latching portion to said shank; and a protuberance extending from said face portion of said prong in proximity to the junction of said shank and said prong, and adapted to bear against said device and to draw said resilient material into said recess portion.

AARON COHN.

REFERENCES CITED

The following references are of record in the file of this patent:

UNITED STATES PATENTS

| Number | Name | Date |
|---|---|---|
| 303,398 | Phillips | Aug. 12, 1884 |
| 1,087,580 | Hamill | Feb. 17, 1914 |
| 1,114,135 | Havertep | Oct. 20, 1914 |
| 1,161,705 | Lloyd | Nov. 23, 1915 |
| 1,260,154 | Day | Mar. 19, 1918 |
| 1,599,985 | Carlson | Sept. 14, 1926 |
| 1,605,695 | Baloyan | Nov. 2, 1926 |
| 1,617,818 | MacKenzie | Feb. 15, 1927 |
| 1,621,213 | Olson | Mar. 15, 1927 |
| 1,768,456 | Smith | June 24, 1930 |
| 2,202,896 | Buchner | June 4, 1940 |
| 2,215,205 | Biernacki | Sept. 17, 1940 |
| 2,264,666 | Hexdall | Dec. 2, 1941 |